(12) United States Patent
Rasanayagam et al.

(10) Patent No.: US 8,551,546 B2
(45) Date of Patent: Oct. 8, 2013

(54) PLASMA GENERATION OF CO FOR MODIFIED ATMOSPHERE PACKAGING

(75) Inventors: Vasuhi Rasanayagam, Bear, DE (US); Meenakshi Sundaram, Newark, DE (US)

(73) Assignee: American Air Liquide, Inc., Fremont, CA (US)

( * ) Notice: Subject to any disclaimer, the term of this patent is extended or adjusted under 35 U.S.C. 154(b) by 0 days.

(21) Appl. No.: 12/973,321

(22) Filed: Dec. 20, 2010

(65) Prior Publication Data
US 2012/0156341 A1    Jun. 21, 2012

(51) Int. Cl.
*A23L 3/3409*    (2006.01)
(52) U.S. Cl.
USPC ............ 426/236; 426/263; 426/316; 426/320
(58) Field of Classification Search
CPC ..................................................... A23L 3/3409
USPC ................ 426/231, 234, 107, 129, 235–236, 426/246, 312, 263, 316, 320
See application file for complete search history.

(56) References Cited

U.S. PATENT DOCUMENTS

| | | | |
|---|---|---|---|
| 3,600,126 A * | 8/1971 | Hellund | 422/23 |
| 4,522,835 A * | 6/1985 | Woodruff et al. | 426/264 |
| 6,803,065 B1 * | 10/2004 | Miyamori et al. | 426/235 |
| 2008/0220133 A1 * | 9/2008 | Carman et al. | 426/320 |
| 2011/0014330 A1 | 1/2011 | Meyers et al. | |

FOREIGN PATENT DOCUMENTS

| | | |
|---|---|---|
| EP | 1 857 269 | 11/2007 |
| WO | WO 2007/058741 | 5/2007 |
| WO | WO 2011/005940 | 1/2011 |

OTHER PUBLICATIONS

Gadri et al.; Sterilization and plasma processing of room temperature surfaces with one atmosphere uniform glow discharge plasma; p. 528-542; 15 pgs. 2000.*
http://www.foodsafetymagazine.com/article.asp?id=1177 &sub=sub1; pp. 1-8; 2007.*
Farber;J.M; (Microbiological Aspects of Modified-Atmosphere packaging Technology) Apr. 25, 1990, total pp. 26.*
Čerňák, et al., "Diffuse coplanar surface barrier discharge and its applications for in-line processing of low-added-value materials," Eur. Phys. J. Appl. Phys. 47 2 (2009) 22806.
Klockow, Paul A., et al., "Safety and quality assessment of packaged spinach treated with a novel ozone-generation system," LWT—Food Science and Technology (2009), doi:10.1016/j.lwt.2009.02.011.
Okazaki, at al., "Atmospheric Pressure Glow," J. Phys. D: Appl. Phys. 26 (1993) 889-892.
Roth, at al., "One Atmosphere Uniform Glow Discharge Plasma (OAUGDP)," J. Phys. D: Appl. Phys. 38 (2005) 555-567.
Schwabedissen, at al., "PlasmaLabel—a new method to Disinfect Goods Inside a Closed Package using Dielectric Barrier Discharges," Contrib. Plasma Phys. 47, No. 7, 551-558 (2007)/DOI 10.1002/ctpp. 200710071.
Tran, N., at al., "Cool plasmas for large scale chemical-free microbial inactivation," Food Austrailia 60 (8), pp. 344-347, 2008.
International Search Report and Written Opinion for PCT/US2011/065182, mailed Mar. 16, 2012.

* cited by examiner

*Primary Examiner* — Steven Leff

(57) ABSTRACT

A CO-containing modified atmosphere packaging (MAP) gas is generated from a processing gas including $CO_2$ and an optional inert gas by applying an electric field under conditions sufficient to generate non-thermal plasma. The fresh appearance of meat or seafood is maintained for a longer time by storing them in a container with the MAP gas.

28 Claims, 1 Drawing Sheet

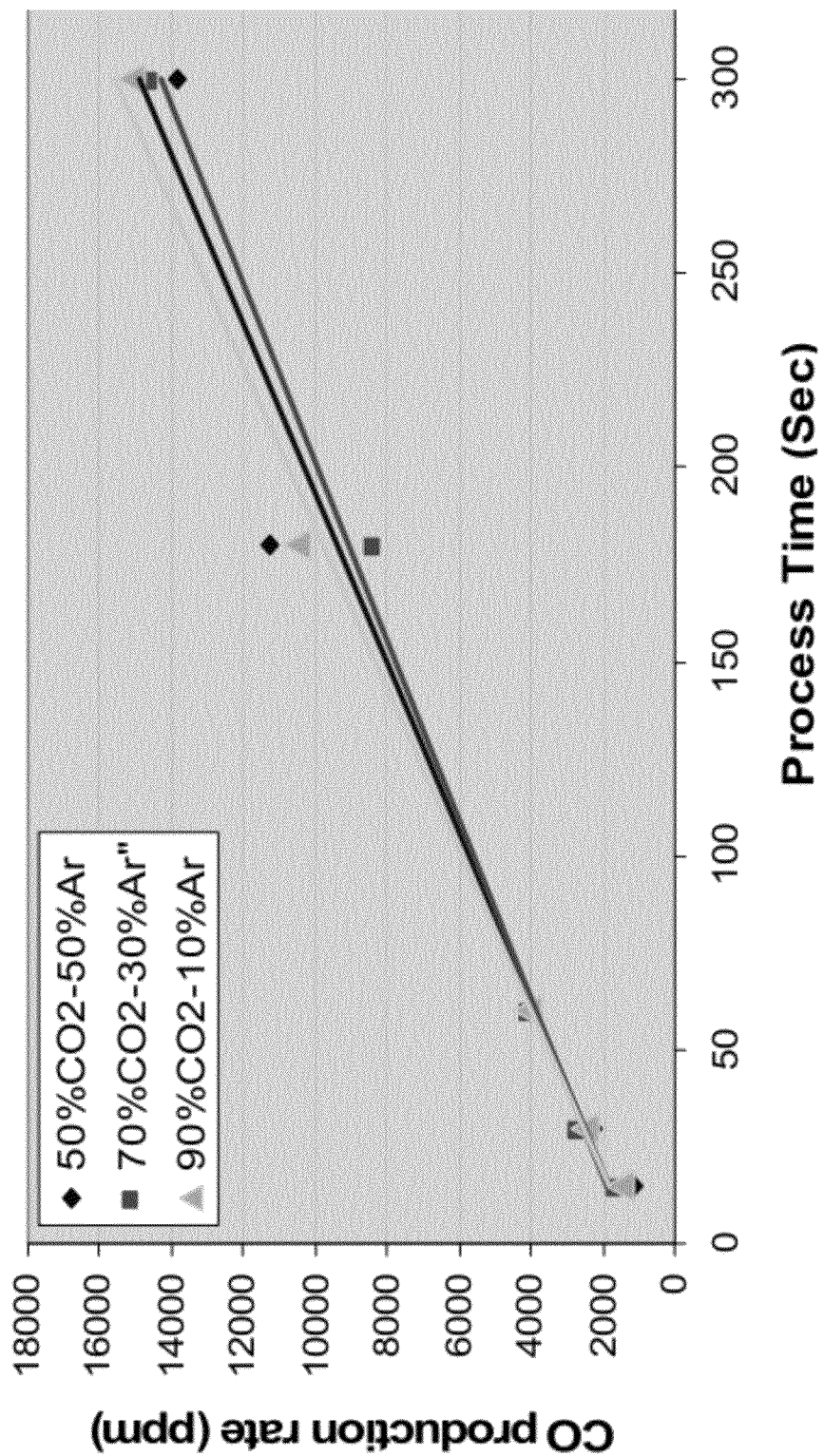

PLASMA GENERATION OF CO FOR MODIFIED ATMOSPHERE PACKAGING

CROSS-REFERENCE TO RELATED APPLICATIONS

None.

BACKGROUND

There are two pigments generally regarded as contributing to the color of red meat, myoglobin and hemoglobin. Both of these pigments are purplish in color with hemoglobin in the blood and myoglobin in the tissue. Since an animal such as a cow, pig, sheep, goat, or chicken is typically bled when it is slaughtered, most of the color pigment remaining in the carcass is myoglobin. Raw red meat that is freshly cut is characteristically purplish in color, mostly as a result of the myoglobin presence. Exposure of the myoglobin to an adequate supply of oxygen results in the formation of oxymyoglobin which gives the desirable red color of the meat. The same type of reaction and change in color occurs with hemoglobin, so for whole fish which has not been bled to the extent as a cow, pig, sheep, goat, or chicken, exposure of the myoglobin and hemoglobin results in the formation of oxymyoglobin and oxyhemoglobin.

With an inadequate supply of oxygen, myoglobin and hemoglobin are converted to metmyoglobin and methemoglobin. Metmyoglobin and methemoglobin are brownish-grey or brownish-blue in color, i.e., the color commonly seen in meat or fish surfaces that are old. Some transparent food packaging films are relatively impermeable to oxygen and the red color of the oxymyoglobin and oxyhemoglobin gradually changes to brownish-grey or brownish-blue and the meat or fish packaged in them becomes unsalable, sometimes as rapid as two to four days after packaging.

Carbon monoxide (CO) acts as a color stabilizer in red meat by binding with myoglobin and hemoglobin creating carboxymyglobin and carboxyhemoglobin, respectively, which are cherry-red in color. CO is an odorless, colorless gas, yet very toxic to humans and animals. In the United States, the use of CO (at amounts up to 0.4% or 4000 ppm) has been approved for packaging of fresh meat and retail packaging applications.

There is an increasing demand from food companies to use CO for stabilization of meat color. However, industrial gas companies may decline to participate in this market due to the safety and liability concerns arising from the handling and distribution of CO in bulk quantities. This is because the relatively pure CO used for blending with other gases poses a substantial asphyxiation risk to operators during the blending process.

Plasma is an at least partially ionized gas composed of ions, electrons, and depending upon the degree of ionization, neutral particles. Plasma is a state of matter distinguishable from solids, liquids, gases, and supercritical fluids. Compared to gas in its natural state, plasma contains free charged particles, electrons and ions, although it is overall electrically neutral. Different types of man-made plasmas can be categorized based upon pressure: vacuum, low pressure, and atmospheric pressure. They can also be categorized based upon whether thermal equilibrium exists between the ions and electrons. In thermal plasmas, the temperature of the heavy ions is equal to the temperature of the electrons.

Non-thermal plasma (also sometimes referred to as cold plasma or non-equilibrium plasma) is in general any plasma which is not in thermodynamic equilibrium, either because the ion temperature is different from the electron temperature, or because the velocity distribution of one of the species does not follow a Maxwell-Boltzmann distribution. As opposed to thermal plasmas where all particles of the medium (neutral molecules, atoms and radicals, ions and electrons have roughly the same energy distribution (meaning a common temperature), in non-thermal plasma electrons have a much higher average energy than heavy species. A limit to such a situation is with the so called cold plasma, corresponding to gas temperature (meaning average energy of the heavy species) is close to ambient. However, some types of plasma may exist that are non-thermal but not cold, with heavy species temperature less than one order of magnitude below the electron temperature. In general, such plasmas are sustained by electrical discharges in a gas close to atmospheric pressure and must be distinguished from other mature, industrially applied plasma technologies like welding, cutting and thermal spraying.

In non-thermal plasma, the free electrons are excited through acceleration by an electric field created by an external source of excitation. In parallel to this acceleration, the electrons undergo random frequent elastic collisions with the molecules and ions, also called heavy particles. Thus electrons continuously gain energy over time in the form of a disordered motion that has similarities with thermal agitation, but is "forced" by electrical energy input and much more intense. The average electron energy corresponds to an equivalent temperature of the order of tens of thousands of degrees. The average energy of electrons is much higher than the heavy particles. If the collisions are not too frequent, in the case of a rarefied gas, for example, they transfer only little energy to the heavy particles and preserve their movement of thermal agitation corresponding to the ambient. If the electrons acquire a very high "temperature" (i.e. average agitation energy) of the order of $10^4$ K they produce inelastic collisions with the heavy particles that produces excitation (in terms of electronic level or vibrational quantified level), ionization (that constantly replenishes the population of electrons and ions to sustain a steady plasma), or dissociation into smaller fragments, atoms and radicals. The excited particles conceal very high "chemical energy" and can be reactive enough to produce surface treatments to a material, without the need to heat the material.

While atmospheric pressure plasma may be produced by several different methods, common ones include corona discharge, dielectric barrier discharge (DBD), and capacitive discharge. A corona discharge is a non-thermal discharge produced through application of high voltage to relatively sharp surfaces of electrode tips. They are commonly used in ozone generators and particle precipitators. DBD is a non-thermal discharge produced through application of high voltages across a small gap between electrodes, but in contrast to corona discharge, DBD requires a dielectric material to prevent the plasma discharge from becoming an electrical arc. DBD is commonly used for surface functionalization of webs and films often for achieving greater adherence of inks, paints, and glues. Capacitive discharge is non-thermal plasma generated through application of radiofrequency (RF) power (e.g., 13.56 MHz) to a powered electrode spaced apart at short distance from a ground electrode. Capacitive discharges are commonly stabilized with a noble gas such as helium or argon.

Corona discharge has long been used for ozone sanitization or sterilization of a wide variety of products. Ozone in such applications is typically generated remote from the chamber in which the product is treated. However, several have suggested the use of a combined combination ozone generation and product treatment chamber wherein a product is placed in a chamber and ozone is produced through corona discharge within the chamber.

In recent years, atmospheric non-thermal plasma has been investigated for sanitization of food products. Bacterial contamination in food products such as packaged spinach has been achieved through treated with ozone generated from non-thermal plasma in either air or oxygen. Paul A. Klockow, Kevin M. Keener, "Safety and quality assessment of packaged spinach treated with a novel ozone-generation system", *LWT—Food Science and Technology* (2009), doi:10.1016/j.lwt.2009.02.011. Ozone is a strong oxidizer and is known to have a deleterious effect upon color stability in food due to its pigment bleaching effect. Microbial surface inactivation through microwave plasmas has also been suggested with the use of helium or krypton to reduce the temperature of the plasma. N. Tran, M. Amidi and P. Sanguansri, "Cool plasmas for large scale chemical-free microbial inactivation", *Food Australia* 60 (8), pp. 344-347.

These attempts to produce plasmas for surface microbial inactivation have either used substantial amounts of oxygen (such as air or oxygen) or have not shown any improvement of color stability.

Thus, there is a need for obtaining the benefits available from non-thermal plasma processing of food products without deleteriously impacting the fresh color of the food product.

As mentioned above, conventional CO-containing MAP gas production poses a substantial asphyxiation risk to operators during the blending process.

Thus, there is a need for a safer way to provide CO for meat or seafood color stabilization.

SUMMARY

There is disclosed a method of color preservation of meat or seafood that comprises the following steps. Meat or seafood is stored in a sealed container containing a modified atmosphere packaging gas comprising $CO_2$ and CO. Before or simultaneous with said step of storing, the $CO_2$ and CO of the modified atmosphere packaging gas are produced by applying an electric field to a processing gas comprising $CO_2$ under conditions sufficient to generate non-thermal plasma comprising $CO_2$ and CO. The processing gas has an oxygen concentration of less than 10% vol/vol $O_2$ and a $CO_2$ concentration of at least 5% vol/vol.

The disclosed method may include one or more of the following aspects:

the processing gas has a $CO_2$ concentration of from 5-10% vol/vol.

the processing gas has a $CO_2$ concentration of from 10-20% vol/vol.

the processing gas has a $CO_2$ concentration of from 20-30% vol/vol.

the processing gas has a $CO_2$ concentration of from 30-40% vol/vol.

the processing gas has a $CO_2$ concentration of from 40-50% vol/vol.

the processing gas has an oxygen concentration of no more than 0.1%.

the processing gas has an oxygen concentration of no more than 0.05%.

the non-thermal plasma has a pressure of 1-1.2 atm and a temperature of 20-225° C.

the meat or seafood is selected from the group consisting of beef, pork, veal, lamb, mutton, goat, and game meat.

the meat or seafood is poultry.

the meat or seafood is fish.

the meat or seafood is beef.

the processing gas further comprises 0-95% of an inert gas.

the inert gas is selected from the group consisting of a noble gas, $N_2$, and mixtures thereof.

the noble gas is Ar, Kr, Xe, or He.

the processing gas essentially consists of $CO_2$ and an inert gas selected from the group consisting of a noble gas, $N_2$, and mixtures thereof.

the non-thermal plasma is generated via dielectric barrier discharge.

the method further comprises the steps of:
  filling a container with the meat or seafood;
  filling the container with the processing gas, wherein the electric field is applied to the processing gas-filled container to generate the non-thermal plasma in an interior of the sealed container; and
  sealing the container after application of the electric field to the processing gas.

the method further comprises the steps of:
  filling a container with the meat or seafood;
  filling the container with the processing gas; and
  sealing the container that is filled with the processing gas and meat or seafood, wherein the electric field is applied to the sealed container to generate the non-thermal plasma in an interior of the sealed container.

the method further comprises the steps of:
  filling a container with the meat or seafood;
  allowing the $CO_2$ and CO of the non-thermal plasma to exit the electric field thereby providing the modified atmosphere packaging gas;
  conveying the modified atmosphere packaging gas from an exterior to an interior of the meat or seafood-filled container, wherein the non-thermal plasma is generated outside the container.

the method further comprises the steps of:
  filling a container with the meat or seafood;
  allowing the $CO_2$ and CO of the non-thermal plasma to exit the electric field;
  blending the exited $CO_2$ and CO with an inert gas thereby providing the modified atmosphere packaging gas; and
  filling the meat or seafood-filled container with the modified atmosphere packaging gas, wherein the non-thermal plasma is generated outside the container.

the non-thermal plasma is generated via corona discharge.

the non-thermal plasma is generated via capacitive discharge.

the modified atmosphere packaging gas has a CO concentration of 1,000-15,000 ppm vol/vol.

the modified atmosphere packaging gas has a CO concentration of 3,000-5,000 ppm vol/vol.

the processing gas essentially consists of 70% vol/vol food-grade Ar and 30% food-grade $CO_2$ the modified atmosphere packaging gas essentially consist of 70% vol/vol food-grade Ar, about 29.6% food-grade $CO_2$, and about 0.4% CO.

the processing gas essentially consists of $CO_2$ and Ar;

the processing gas has a $CO_2$ concentration of from 20-40% vol/vol;

the processing gas has an oxygen concentration of no more than 0.1%;
the meat or seafood is beef;
the modified atmosphere packaging gas essentially consists of $CO_2$, Ar, and CO.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein:

The FIGURE is a graph of CO level vs. processing time for various processing gas mixtures of $CO_2$ and Ar.

DESCRIPTION OF PREFERRED EMBODIMENTS

A modified atmosphere packaging (MAP) gas containing CO may be generated with greater safety by placing a processing gas within an electric field under conditions sufficient to generate plasma. The processing gas includes $CO_2$ and optionally an inert gas. Without being bound by any particular theory, we believe that CO is generated from $CO_2$ in the plasma according to reaction (I).

$$2CO_2 \rightarrow 2CO + O_2 \qquad (I)$$

Upon discontinuation of the electric field or removal of the gas from the electric field, the CO remains in stable form. The remaining $CO_2$, the generated CO, and the optional inert gas, provide a MAP gas which can be used to preserve color stability in packaged meat or seafood. The small amount of CO generated (for example, about 1,000 ppm to about 15,000 ppm vol/vol) inhibits the formation of brownish-gray or brownish-blue metmyoglobin and methemoglobin in meat and seafood.

The processing gas includes 5-100% vol/vol of $CO_2$ and 95-0% vol/vol of an inert gas. The $CO_2$ typically is relatively pure with a concentration of at least 99% vol/vol. More typically, the $CO_2$ is industrially pure containing at least 99.5% vol/vol of $CO_2$ and no more than 50 ppm vol/vol $O_2$. The processing gas may be prepared by blending $CO_2$ with inert gas.

The inert gas can be Ar, Xe, Kr, He, or a blend of two or more. Typically, the inert gas is a noble gas (Ar, Xe, Kr, He). Such noble gases enable easier generation and maintenance of the non-thermal plasma. With the lower cost of $N_2$ in mind, the inert gas can include a minor amount (less than 50% vol/vol of the inert gas) of $N_2$. The presence of a noble gas allows easier achievement and maintenance of non-thermal plasma. Since $N_2$ is generally less costly than the noble gases, it may be desirable to use a mixture of $N_2$ and a noble gas. If the processing gas does include $N_2$, typically the $N_2$ is a minor portion of the inert gas (<50% vol/vol) and the noble gas is a major portion of the inert gas (>50% vol/vol).

For non-thermal plasmas generated from oxygen-containing gases, ozone ($O_3$) is primarily generated from ionization of oxygen with participation from other molecules/ions. So, while the processing gas may include $O_2$ in amounts less than 10% vol/vol, better color preservation results may be expected with processing gases containing relatively low levels of $O_2$. Typically, the processing gas contains no more than 0.1% vol/vol $O_2$. In many embodiments, the processing gas contains less than 0.05% vol/vol $O_2$.

In packaged meat or seafood, $CO_2$ can readily adsorb or dissolve within the tissue of many types of meats or seafood leading to a decreased pressure within a sealed container over time. This may subject the container to collapse and/or subject the packaging film to a greater incidence of punctures and consequent leaking of fluids. Thus, it can sometimes be desirable to have a relatively lower amount of $CO_2$ within the MAP gas. This may be achieved by limiting the $CO_2$ content in the processing gas to no more than 50% vol/vol, no more than 40% vol/vol, or no more than 30% vol/vol. A non-limited list of some processing gases suitable for such conditions includes: 70% vol/vol Ar and 30% vol/vol $CO_2$, 80% vol/vol Ar and 20% vol/vol $CO_2$, and 90% vol/vol Ar and 10% vol/vol $CO_2$.

The amount of CO generated from $CO_2$ in the non-thermal plasma is related to the electron density in the plasma, the dielectric properties of the container (if the non-thermal plasma is directly generated within the container), the amount of $CO_2$ in the processing gas, and the processing time in which the processing gas is subjected to the non-thermal plasma generating electric field. Thus, for low plasma electron densities and/or brief processing times, it may be desirable to utilize a processing gas having a relative high level of $CO_2$. A non-limited list of some processing gases suitable for such conditions includes: 60% vol/vol noble gas and 40% vol/vol $CO_2$, 50% noble gas vol/vol and 50% C vol/vol $O_2$, 40% vol/vol noble gas and 60% vol/vol $CO_2$, 30% noble gas vol/vol and 70% vol/vol $CO_2$, 20% vol/vol noble gas and 80% vol/vol $CO_2$, 10% vol/vol noble gas and 90% vol/vol $CO_2$, 5% vol/vol noble gas and 95% vol/vol $CO_2$, and 100% $CO_2$.

Three well known techniques are used for generating non-thermal plasmas: dielectric barrier discharge (DBD) type, corona discharge type, or capacitive discharge type. The selection of the non-thermal plasma generation technique for a given application will depend upon a number of design considerations such as size, geometry, cost, energy usage, etc.

In a first way, DBD-generated non-thermal plasma can be produced by placing the processing gas in a chamber made of a dielectric material. On the sides of the chamber opposite the processing gas are disposed two electrodes against which a low power, AC or DC high voltage is applied. The dielectric material insulates the electrode thereby limiting current densities to below the threshold at which an arc is created between the electrodes. Alternatively, the container of meat or seafood may be made of a dielectric material and serve as the chamber made of a dielectric material. In this alternative case, both of the electrodes may be kept separate from the container or one of the electrodes may be adhered to an outer surface of the container.

In a second way, DBD-generated non-thermal plasma can be produced by placing the processing gas in a chamber which also includes a dielectric-coated electrode. A kHz range power is applied to two electrodes outside the container that are capacitively coupled to the dielectric-coated electrode inside the container in order to drive a DBD at the surface of the dielectric-coated electrode inside the container. The dielectric material coating insulates the inner electrode thereby limiting current densities to below the threshold at which an arc is created between the electrodes. Alternatively, the container of meat or seafood may be made of a dielectric material and serve as the chamber made of a dielectric material.

Two types of DBD-generated non-thermal plasmas are the filamentary discharge type and the diffuse discharge type. A filamentary non-thermal plasma refers to the visual plasma structure which exhibits many brief (for example, <100 ns) and narrow (for example, about 200 μm) current filaments or streamers. Filamentary discharges produce a relatively low density of active species where most of the atoms and radicals are produced inside the narrow filaments and are rapidly lost to recombination. Researchers at Purdue University have developed a relatively simple technique for producing filamentary-type non-thermal plasma. In a diffuse discharge, no filamentary structure is observed. Diffuse discharges have been shown to deliver a relatively more homogeneous and efficient surface treatment than filamentary DBD. One example of diffuse discharge includes Atmospheric Pressure Glow (APG). Okazaki et al., J. Phys. D: Appl. Phys. 26 (1993) 889-892. Another type includes One Atmosphere Uniform Glow Discharge Plasma (OAUGDP). Roth et al., J. Phys. D: Appl. Phys. 38 (2005) 555-567. Yet another type includes Diffuse Coplanar Surface Barrier Discharge (DCSBD). Čermák et al., Eur. Phys. J. Appl. Phys. 47 2 (2009) 22806.

Many different corona discharge devices are commercially available. Typically, the corona discharge device is an ozone generator which is operated under conditions to suppress the production of ozone. In other words and as described above, unacceptable levels of $O_2$ in the processing gases are avoided.

Capacitively coupled non-thermal plasma is generated from two closely spaced electrodes one of which is connected to a radio-frequency RF power supply and the other of which is grounded. The processing gas is of course disposed between the electrodes.

The temperature and pressure of the processing gas (except the electron temperature) before generation of the non-thermal plasma typically are around 20-25° C. and 1.0-1.2 atm. During non-thermal plasma generation, the temperature rise of the gas (except for the electron temperature) is due to energy released and the residence time of the gas in the plasma. The temperature rise of a gas in conventional non-thermal plasma generation techniques are commonly less than 200° C. For food processing applications, the temperature rise should be less than 50° C.

The processing time is defined as the duration of time in which the non-thermal plasma is generated from the processing gas. The processing time is related to the amount of CO desired in the MAP gas, the amount of $CO_2$ present in the processing gas that is subjected to the non-thermal plasma, the plasma electron density, and the presence of plasma-initiating gases such as noble gases. When the processing time serves as a bottleneck to an overall process of filling meat or seafood-container containers with the processing gas or MAP gas, the $CO_2$ in the processing gas may be kept relatively lower, the plasma electron density may be maintained at a relatively higher level, and a noble gas may be included in the processing gas. Typically, the processing time is no more than 5 minutes. More typically, it is no more than 1 minute.

The CO level generated from the $CO_2$ in the processing gas and the remaining $CO_2$ level are dependent upon the plasma electron density, the processing time, and the presence of a noble gas as a plasma-initiating species. Typically, the CO content in the MAP gas is about 1,000-15,000 vol/vol ppm. More typically, the CO content in the MAP gas is about 3,000-5,000 ppm vol/vol. If a processing gas including a noble gas is used, we believe that no long-lasting stable molecular species including Ar, Kr, Xe, or He atoms is formed. Thus, we believe that the level of any noble gas in the MAP gas is determined by the content of noble gas in the processing gas.

While, a non-limited list of suitable materials for the container include polymers (for example, in bag or rigid container form) and glass container, basically any container exhibiting dielectric properties may be used.

The MAP gas may be generated either within the container of meat or seafood or it may be generated remote from the container where the container is subsequently filled with the generated MAP gas.

In the first case, the container is filled with the processing gas and an amount of the meat or seafood. The container may be sealed before application of the electric field and generation of the non-thermal plasma inside it. At expiration of the desired processing time, application of the electric field is discontinued and the container is sealed if not already done. The resultant CO-containing MAP gas within the container helps to preserve the desired color in the meat or seafood over a longer period of time in comparison to MAP gases not including CO. For best results, before filling the container with the processing gas it is first subjected to a vacuum to remove some of the oxygen present either in the atmosphere inside the container or within the tissue of the meat or seafood.

In the second case, the meat or seafood is placed within the unsealed container. Outside the container, an electric field is applied to the processing gas in a chamber under conditions sufficient to generate the non-thermal plasma. This may be performed either in batch or continuous mode. In batch mode, once the processing time has expired, application of the electric field is discontinued and the resultant MAP gas is either conveyed to a storage/buffer vessel for later filling of the container or is conveyed directly to the container for filling thereof. In continuous mode, an electric field is applied to a stream of the processing gas. The resultant MAP gas exiting the electric field either flows to a storage/buffer vessel for later filling of the container or flows directly into an interior of the container with the meat or seafood. The stream of MAP gas may be diverted to different container interiors with the use of an appropriately designed gas manifold such as a modified atmosphere packaging machine. Regardless of whether a batch or continuous mode is elected, a vacuum may be applied to the container interior to remove an amount of oxygen in the tissue of the meat or seafood and enhance the flow of the MAP gas into the container. The application of vacuum could be performed while the container is in a food packaging machine. A suitable system for performing this is described in U.S. application Ser. No. 12/651,409 filed on Dec. 31, 2009, the contents of which are incorporated herein by reference in their entirety. Optionally, the CO-containing gas resulting from the non-thermal plasma processing may be blended with an inert gas subsequent to the non-thermal plasma generation in order to provide the MAP gas that is used to fill the container. Again, this may be performed in batch or continuous mode and either stored temporarily in a storage/buffer vessel or allowed to flow directly into the container.

Any number of types of meats or seafood may be treated with the invention. A non-limiting list of meats includes beef, pork, veal, lamb, mutton, game meat, goat, or poultry. As beef contains relatively higher levels of myoglobin, application of the invention is especially advantageous. While any type of fish may be treated with the invention, application of the invention is especially advantageous for pink or red pigmented fish and/or whole fish which contain relatively higher levels of hemoglobin than filleted or cut fish portions.

Example 1

Different blends of $CO_2$ and a balance gas of $N_2$ or Ar were prepared using mass flow controllers to provide various processing gases as shown in Table I.

TABLE I

Example 1 processing gases

| Example | % CO₂ vol/vol | % Ar vol/vol |
|---------|---------------|--------------|
| 1A | 50 | 50 |
| 1B | 70 | 30 |
| 1C | 90 | 10 |

4.5 liters of each processing gas was filled into a separate 1 gallon Ziplock® food storage bag. Each processing gas-filled bag in turn was placed between two electrodes having a constant gap between them. High voltage was applied to the electrodes to produce and maintain the non-thermal plasma for 5 minutes. A sample of the gas inside the bag (representing the MAP gas) was analyzed for ozone and CO.

A plot of CO concentration vs. processing time for Examples 1A-1C is shown in the FIG.

As shown in the FIG, achievement of significant CO levels with a reasonable amount of processing time is possible with a processing gas containing $CO_2$ and an Ar balance gas. More particularly, 50-90% vol/vol $CO_2$ in a processing gas (with a balance gas of Ar) results in at least 4,000 ppm of CO in less than 90 seconds. Moreover, nearly 15,000 ppm vol/vol of CO is possible in 5 minutes.

Example 2

A study was performed to evaluate the color retention under different gas atmospheres. Seven portions of fresh beef were placed onto separate trays in a MAP machine. After application of vacuum, one of them (Example 2A) was vacuum packed. The remaining six (Examples 2B-2F) were filled with one of the various processing or MAP gases listed in Table II. Out of these six, three of them (Examples 2E-2G) were subjected to non-thermal plasma treatment by placing them between a pair of electrodes to which a low power high voltage was applied. All six were then refrigerated. At the end of 48 hours, the CO concentration inside the package was measured as necessary and the color of the meat observed. The details are tabulated in Table II.

TABLE II

Conditions for Comparison of MAP Gases and Vacuum Packaging

| Example | Processing/MAP Gas | Plasma Treated | CO Conc. (vol/vol) | Meat Color |
|---------|-------------------|----------------|---------------------|------------|
| 2A | vacuum packed | no | n/a | brownish gray |
| 2B | 0.3% CO vol/vol with balance N2 | no | 3078 ppm | bright red |
| 2C | 30% CO₂ vol/vol with balance Ar | no | n/a | dark |
| 2D | 30% CO₂ vol/vol with balance N2 | no | n/a | dark |
| 2E | 30% CO₂ vol/vol with balance Ar | yes | 3651 ppm | bright red |
| 2F | 30% CO₂ vol/vol with balance N2 | yes | 686 ppm | dark red |
| 2G | 30% CO₂ vol/vol with balance N2 | yes | 1425 ppm | dark red |

As seen in Table II, the color of the beef stored under a MAP gas containing CO produced according to the described method was comparable to the color of the beef stored under the conventional CO-containing MAP gas. On the other hand, the initial fresh color of the vacuum packed beef and the beef stored under $CO_2/Ar$ or $CO_2/N_2$ and not non-thermal plasma treated were not observed. Storing the meat under a MAP gas containing CO produced by subjecting a $CO_2/N_2$ processing gas to non-thermal plasma treatment resulted in more of a cured meat color. Without being bound by any particular theory, we believe that this is probably due to production of NO/NOx during the non-thermal plasma treatment.

Preferred processes and apparatus for practicing the present invention have been described. It will be understood and readily apparent to the skilled artisan that many changes and modifications may be made to the above-described embodiments without departing from the spirit and the scope of the present invention. The foregoing is illustrative only and that other embodiments of the integrated processes and apparatus may be employed without departing from the true scope of the invention defined in the following claims.

What is claimed is:

1. A method of color preservation of meat or seafood, comprising the steps of:
    storing meat or seafood in a sealed container containing a modified atmosphere packaging gas comprising $CO_2$ and CO; and
    before or simultaneous with said step of storing, the $CO_2$ and CO of the modified atmosphere packaging gas are produced by applying an electric field to a processing gas comprising $CO_2$ under conditions sufficient to generate non-thermal plasma comprising $CO_2$ and CO, wherein the processing gas has an oxygen concentration of less than 10% vol/vol $O_2$ and a $CO_2$ concentration of at least 5% vol/vol.

2. The method of claim 1, wherein the processing gas has a $CO_2$ concentration of from 5-10% vol/vol.

3. The method of claim 1, wherein the processing gas has a $CO_2$ concentration of from 10-20% vol/vol.

4. The method of claim 1, wherein the processing gas has a $CO_2$ concentration of from 20-30% vol/vol.

5. The method of claim 1, wherein the processing gas has a $CO_2$ concentration of from 30-40% vol/vol.

6. The method of claim 1, wherein the processing gas has a $CO_2$ concentration of from 40-50% vol/vol.

7. The method of claim 1, wherein the processing gas has an oxygen concentration of no more than 0.1%.

8. The method of claim 1, wherein the processing gas has an oxygen concentration of no more than 0.05%.

9. The method of claim 1, wherein the non-thermal plasma has a pressure of 1-1.2 atm and a temperature of 20-225° C.

10. The method of claim 1, wherein the meat or seafood is selected from the group consisting of beef, pork, veal, lamb, mutton, goat, and game meat.

11. The method of claim 1, wherein the meat or seafood is poultry.

12. The method of claim 1, wherein the meat or seafood is fish.

13. The method of claim 1, wherein the meat or seafood is beef.

14. The method of claim 1, wherein the processing gas further comprises 0-95% of an inert gas.

15. The method of claim 14, wherein the inert gas is selected from the group consisting of a noble gas, $N_2$, and mixtures thereof.

16. The method of claim 15, wherein the noble gas is Ar, Kr, Xe, or He.

17. The method of claim 1, wherein the processing gas consists essentially of $CO_2$ and an inert gas selected from the group consisting of a noble gas, $N_2$, and mixtures thereof.

18. The method of claim 1, wherein the non-thermal plasma is generated via dielectric barrier discharge.

19. The method of claim 18, further comprising the steps of:
- filling a container with the meat or seafood;
- filling the container with the processing gas, wherein the electric field is applied to the processing gas-filled container to generate the non-thermal plasma in an interior of the sealed container; and
- sealing the container after application of the electric field to the processing gas.

20. The method of claim 18, further comprising the steps of:
- filling a container with the meat or seafood;
- filling the container with the processing gas;
- sealing the container that is filled with the processing gas and meat or seafood, wherein the electric field is applied to the sealed container to generate the non-thermal plasma in an interior of the scaled container.

21. The method of claim 18, further comprising the steps of:
- filling a container with the meat or seafood;
- allowing the $CO_2$ and CO of the non-thermal plasma to exit the electric field thereby providing the modified atmosphere packaging gas;
- conveying the modified atmosphere packaging gas from an exterior to an interior of the meat or seafood-filled container, wherein the non-thermal plasma is generated outside the container.

22. The method of claim 18, further comprising the steps of:
- filling a container with the meat or seafood;
- allowing the $CO_2$ and CO of the non-thermal plasma to exit the electric field;
- blending the exited $CO_2$ and CO with an inert gas thereby providing the modified atmosphere packaging gas; and
- filling the meat or seafood-filled container with the modified atmosphere packaging gas, wherein the non-thermal plasma is generated outside the container.

23. The method of claim 1, wherein the non-thermal plasma is generated via corona discharge.

24. The method of claim 1, wherein the non-thermal plasma is generated via capacitive discharge.

25. The method of claim 1, wherein the modified atmosphere packaging gas has a CO concentration of 1,000-15,000 ppm vol/vol.

26. The method of claim 1, wherein the modified atmosphere packaging gas has a CO concentration of 3,000-5,000 ppm vol/vol.

27. The method of claim 1, wherein:
- the processing gas consists essentially of 70% vol/vol food-grade Ar and 30% food-grade $CO_2$; and
- the modified atmosphere packaging gas essentially consist of 70% vol/vol food-grade Ar, about 29.6% food-grade $CO_2$, and about 0.4% CO.

28. The method of claim 1, wherein:
- the processing gas consists essentially, of $CO_2$ and Ar;
- the processing gas has a $CO_2$ concentration of from 20-40% vol/vol;
- the processing gas has an oxygen concentration of no more than 0.1%;
- the meat or seafood is beef; and
- the modified atmosphere packaging gas consists essentially of $CO_2$, Ar, and CO.

* * * * *